(12) United States Patent
Stevenson (10) Patent No.: US 7,014,590 B2
(45) Date of Patent: Mar. 21, 2006

(54) SEVEN-SPEED TRANSMISSION

(75) Inventor: Paul D. Stevenson, Ann Arbor, MI (US)

(73) Assignee: General Motors Corporation, Detroit, MI (US)

(*) Notice: Subject to any disclaimer, the term of this patent is extended or adjusted under 35 U.S.C. 154(b) by 143 days.

(21) Appl. No.: 10/784,641

(22) Filed: Feb. 23, 2004

(65) Prior Publication Data

US 2004/0266582 A1  Dec. 30, 2004

Related U.S. Application Data

(60) Provisional application No. 60/480,956, filed on Jun. 24, 2003.

(51) Int. Cl.
*F16H 3/44* (2006.01)

(52) U.S. Cl. ........................ 475/284; 475/325
(58) Field of Classification Search ............ 475/277, 475/278, 284, 313, 325
See application file for complete search history.

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,139,463 A * | 10/2000 | Kasuya et al. | 475/275 |
| 6,723,018 B1 * | 4/2004 | Hayabuchi et al. | 475/277 |
| 6,827,664 B1 * | 12/2004 | Stevenson et al. | 475/278 |
| 2002/0065164 A1 * | 5/2002 | Kato et al. | 475/285 |
| 2002/0142880 A1 * | 10/2002 | Hayabuchi et al. | 475/284 |

* cited by examiner

*Primary Examiner*—Roger Pang
(74) *Attorney, Agent, or Firm*—Christopher DeVries (57) ABSTRACT

A seven-speed transmission includes an input shaft, an output shaft, and three planetary gear sets. An interconnecting member continuously connects members of the second and third planetary gear sets. Six torque-transmitting mechanisms are provided between the planetary gear sets and a transmission housing. The six torque-transmitting mechanisms are engaged in combinations of two to establish seven forward speed ratios and a reverse speed ratio between the input shaft and the output shaft.

22 Claims, 5 Drawing Sheets

FIG. 3a

| GEAR STATE | GEAR RATIO | RATIO STEPS | C1234 (50) CLUTCH PC3(26) S1 | C5 (52) CLUTCH R3 S1 | CB27 (54) CLUTCH S2 GROUND | C36R (56) CLUTCH PC3(26) S2 | C4567 (58) CLUTCH R3 PC1(46) GROUND | CB1R (59) CLUTCH PC2(36) GROUND |
|---|---|---|---|---|---|---|---|---|
| Rev | −2.763 |  |  |  |  | X |  | X |
| N |  | −0.59 |  |  |  |  |  | O |
| 1st | 4.713 | 1.70 | G |  |  |  |  | X |
| 2nd | 2.769 | 1.70 | X |  | X |  |  |  |
| 3rd | 1.625 | 1.41 | X |  |  | X |  |  |
| 4th | 1.153 | 1.15 | X |  |  |  | X |  |
| 5th | 1.000 | 1.23 |  | X |  |  | X |  |
| 6th | 0.815 | 1.30 |  |  |  | X | X |  |
| 7th | 0.630 |  |  |  | X |  | X |  |
| 8th |  |  |  |  |  |  |  |  |

OVERALL RATIO: 7.48

FIG. 3b

| R/S RATIOS | R1/S1 | R2/S2 | R3/S3 |
|---|---|---|---|
|  | 2.90 | 1.70 | 1.60 |
| P/S RATIOS | P1s/S1 | P1r/S1 | P2/S2 | P3/S3 |
|  | 0.81 | 0.81 | 0.35 | 0.30 |

SEVEN-SPEED TRANSMISSION

CROSS-REFERENCE TO RELATED APPLICATION

This application claims the benefit of U.S. Provisional Application 60/480,956, filed Jun. 24, 2003, which is hereby incorporated by reference in its entirety.

TECHNICAL FIELD

The present invention relates to a transmission having three planetary gear sets that are controlled by six torque-transmitting mechanisms to provide seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

A seven-speed transmission is provided using minimal content, and in a manner which achieves desirable ratio steps and a wide overall ratio.

Specifically, the multi-speed transmission includes an input shaft, an output shaft, and a planetary gear arrangement having first, second and third planetary gear sets. Each planetary gear set has first, second and third members. The input shaft is continuously interconnected with the first member of the first planetary gear set, and the output shaft is continuously connected with the first member of the third planetary gear set. The first member of the second planetary gear set is integrally connected with the first member of the third planetary gear set. The third member of the first planetary gear set is continuously connected with a transmission housing.

An interconnecting member continuously connects the second member of the second planetary gear set with the second member of the third planetary gear set. A first torque-transmitting mechanism selectively connects the second member of the first planetary gear set with the third member of the third planetary gear set. A second torque-transmitting mechanism selectively connects the first member of the first planetary gear set with the third member of the third planetary gear set. A third torque-transmitting mechanism selectively connects the third member of the second planetary gear set with the transmission housing. A fourth torque-transmitting mechanism selectively connects the second member of the first planetary gear set with the third member of the second planetary gear set. A fifth torque-transmitting mechanism selectively connects the first member of the first planetary gear set with the second member of the third planetary gear set. A sixth torque-transmitting mechanism selectively connects the second member of the second planetary gear set with the transmission housing.

The first, second, third, fourth, fifth and sixth torque-transmitting mechanisms are engaged in combinations of two to establish seven forward speed ratios and a reverse speed ratio between the input shaft and the output shaft.

Preferably, each of the first members is a ring gear, each of the second members is a planet carrier assembly member, and each of the third members is a sun gear.

The ring gears of the second and third planetary gear sets may be a single elongated ring gear, or they may be two ring gears interconnected by a sleeve and separated by a spacer and spring member.

The first and second planetary gear sets are simple planetary gear sets, and the third planetary gear set is a compound planetary gear set.

The first, second, fourth and fifth torque-transmitting mechanisms are rotating clutches, and the third and sixth torque-transmitting mechanisms are brakes.

The second torque-transmitting mechanism may be positioned between the first and second planetary gear sets, or at a location which is not between the first, second and third planetary gear sets (i.e., to the left of the left-most planetary gear set in any of the Figures).

The above features and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
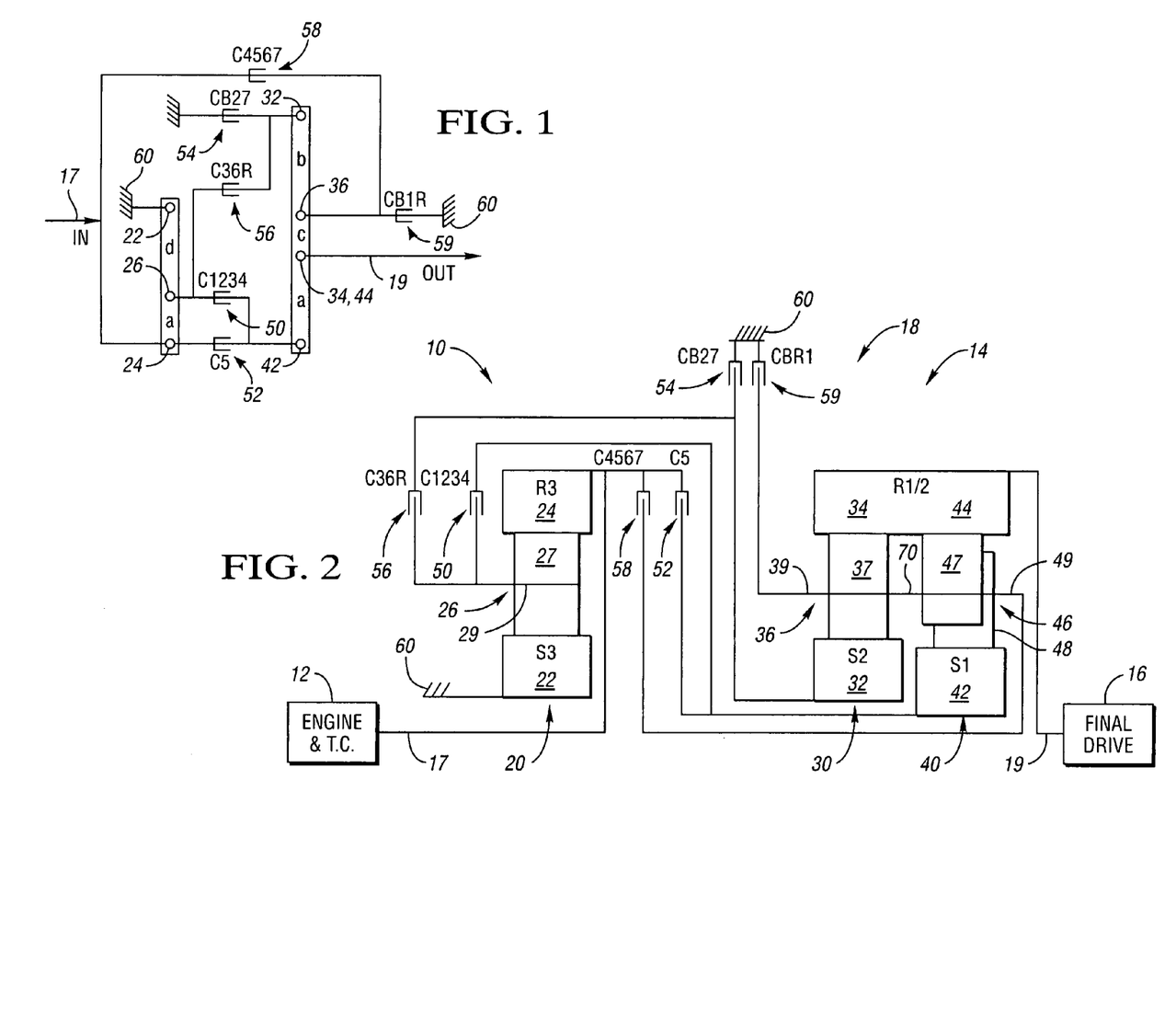
FIG. 1 shows a lever diagram of a transmission in accordance with the invention.
FIG. 2 shows a stick diagram corresponding with the lever diagram of FIG. 1.

FIG. 1 shows a lever diagram of a transmission in accordance with the invention. The mechanisms will be described with specific reference to the stick diagram of FIG. 2, wherein like reference numerals refer to like components from FIG. 1.

Referring to FIG. 2, there is shown a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 (the first planetary gear set) includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 (the second planetary gear set) includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 (the third planetary gear set) includes a sun gear member 42, a ring gear member 44, and a planetary gear set 46. The ring gear member 34 is integrally connected with the ring gear member 44. In other words, the ring gear members 34, 44 are formed by a single elongated ring gear member, or are connected together by a sleeve to which both ring gear members 34, 44 are splined. The planet carrier assembly member 46 includes a plurality of pinion gears 47, 48 rotatably mounted on a carrier member 49. The pinion gears 47 are disposed in meshing relationship with the ring gear member 44, and the pinion gears 48 are disposed in meshing relationship with the sun gear member 42. The pinion gears 47, 48 also mesh with each other.

The planetary gear arrangement 18 also includes six torque-transmitting mechanisms. The torque-transmitting mechanisms 50, 52, 56, 58 are rotating torque-transmitting mechanisms, commonly termed clutches. The torque-transmitting mechanisms 54, 59 are stationary type torque-transmitting mechanisms, commonly termed brakes or reaction clutches.

The input shaft 17 is continuously connected with the ring gear member 24, and the output shaft 19 is continuously connected with the ring gear member 44. An interconnecting member 70 continuously interconnects the planet carrier assembly member 36 with the planet carrier assembly member 46. The sun gear member 22 is continuously connected with the transmission housing 60 (i.e., a stationary member).

The planet carrier assembly member 26 is selectively connectable with the sun gear member 42 through the clutch 50. The ring gear member 24 is selectively connectable with the sun gear member 42 through the clutch 52. The sun gear member 32 is selectively connectable with the transmission housing 60 through the brake 54. The planet carrier assembly member 26 is selectively connectable with the sun gear member 32 through the clutch 56. The ring gear member 24 is selectively connectable with the planet carrier assembly member 46 through the clutch 58. The planet carrier assembly member 36 is selectively connectable with the transmission housing 60 through the clutch 59.

The appended claims refer to first, second and third members, which are the ring gear member, planet carrier assembly member, and sun gear member of the gear sets, respectively.

Figure 3A:
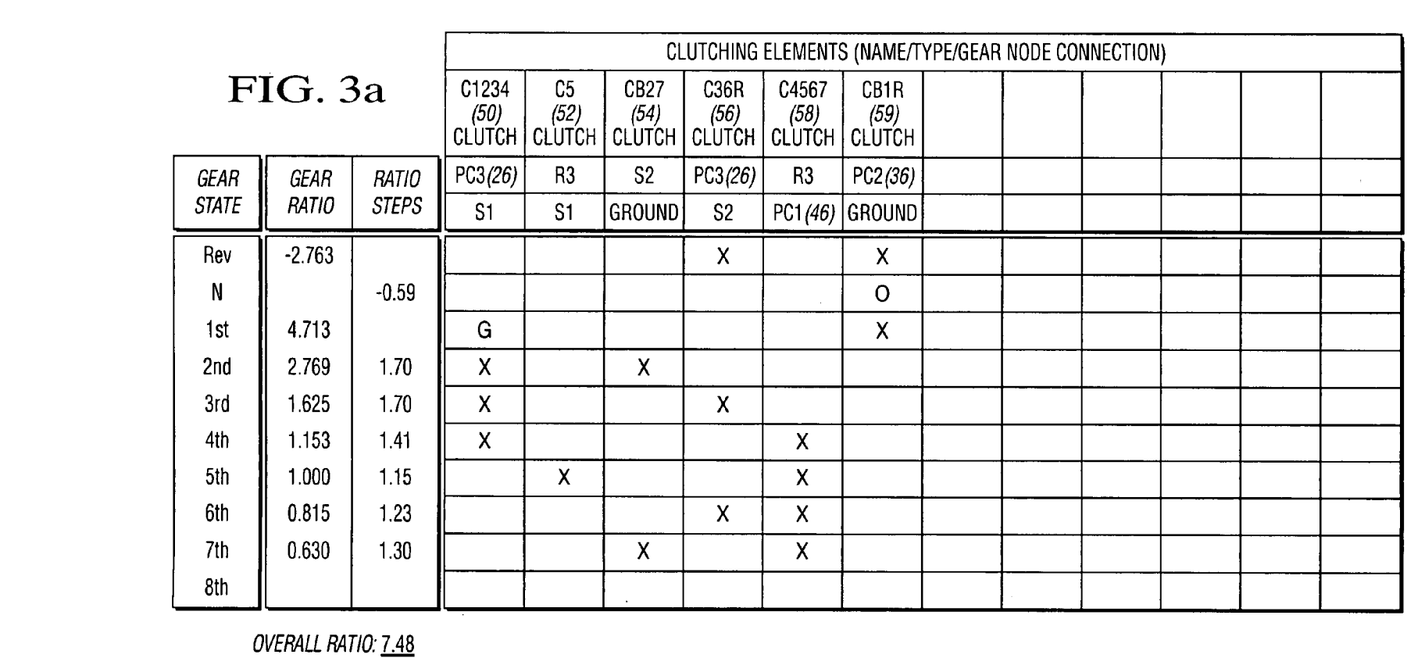
FIGS. 3a and 3b show a Truth Table and a Ring Gear/Sun Gear Ratio Table, respectively, corresponding with the diagrams of FIGS. 1 and 2.

As shown in the truth table (i.e., Clutching Table) of FIG. 3a, the torque-transmitting mechanisms 50, 52, 54, 56, 58, 59 are selectively engaged in combinations of two to provide seven forward speed ratios and one reverse speed ratio. It should also be noted in the truth table that the torque-transmitting mechanism 59 remains engaged through the neutral condition, thereby simplifying the forward/reverse interchange.

To establish the reverse speed ratio, the clutch 56 and brake 59 are engaged. The clutch 56 connects the planet carrier assembly member 26 with the sun gear member 32, and the brake 59 connects the planet carrier assembly member 36 with the transmission housing 60. As illustrated in the truth table, the overall numerical value of the reverse speed ratio is −2.763.

The first forward speed ratio is established with the engagement of the clutch 50 and the brake 59. The clutch 50 connects the planet carrier assembly member 26 with the sun gear member 42, and the brake 59 connects the planet carrier assembly member 36 with the transmission housing 60. The overall numerical value of the first forward speed ratio is 4.713, as indicated in the truth table.

The second forward speed ratio is established with the engagement of the clutch 50 and brake 54. The clutch 50 connects the planet carrier assembly member 26 with the sun gear member 42, and the brake 54 connects the sun gear member 32 with the transmission housing 60. The overall numerical value of the second forward speed ratio is 2.769, as indicated in the truth table.

The third forward speed ratio is established with the engagement of the clutches 50, 56. The clutch 50 connects the planet carrier assembly member 26 with the sun gear member 42, and the clutch 56 connects the planet carrier assembly member 26 with the sun gear member 32. The overall numerical value of the third forward speed ratio is 1.625, as indicated in the truth table.

The fourth forward speed ratio is established with the engagement of the clutches 50, 58. Again, the clutch 50 connects the planet carrier assembly member 26 with the sun gear member 42, and the clutch 58 connects the ring gear member 24 with the planet carrier assembly member 46. The overall numerical value of the fourth forward speed ratio is 1.153, as indicated in the truth table.

The fifth forward speed ratio is established with the engagement of the clutches 52, 58. The clutch 52 connects the ring gear member 24 with the sun gear member 42, and the clutch 58 connects the ring gear member 24 with the planet carrier assembly member 46. In this configuration, the input shaft 17 is directly connected to the output shaft 19, so the overall numerical value of the fifth forward speed ratio is 1, as indicated in the truth table.

The sixth forward speed ratio is established with the engagement of the clutches 56, 58. The clutch 56 connects the planet carrier assembly member 26 with the sun gear member 32, and the clutch 58 connects the ring gear member 24 with the planet carrier assembly member 46. The overall numerical value of the sixth forward speed ratio is 0.815, as indicated in the truth table.

The seventh forward speed ratio is established with the engagement of the brake 54 and clutch 58. The brake 54 connects the sun gear member 32 with the transmission housing 60, and the clutch 58 connects the ring gear member 24 with the planet carrier assembly member 46. The numerical value of the seventh forward speed ratio is 0.630, as indicated in the truth table.

Figure 3B:
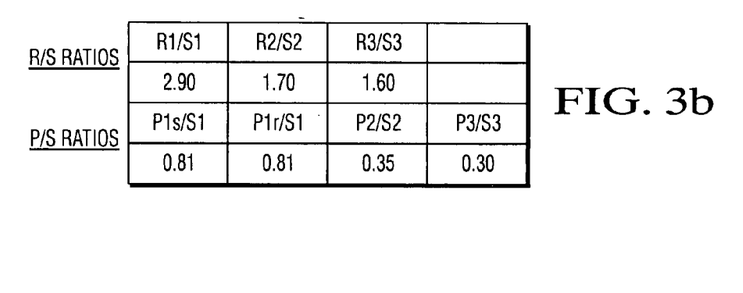

As set forth above, the engagement schedules for the torque-transmitting mechanisms are shown in the truth table of FIG. 3a. This truth table also provides an example of speed ratios that are available utilizing the ring gear/sun gear tooth ratios given by way of example in the R/S Ratios table of FIG. 3b. The R1/S1 ratio is the ring gear/sun gear tooth ratio of the planetary gear set 40; the R2/S2 ratio is the ring gear/sun gear tooth ratio of the planetary gear set 30; and the R3/S3 ratio is the ring gear/sun gear tooth ratio of the planetary gear set 20. Also, the truth table of FIG. 3a describes the ratio steps that can be attained utilizing the sample of tooth ratios given. For example, the step ratio between the first and second forward ratios is 1.70, while the step ratio between the reverse and first forward ratio is −0.59. It can also be readily determined from the truth table of FIG. 3 that all of the single step forward ratio interchanges are of the single transition variety.

The stick diagram of FIG. 2 shows the clutch 52 positioned between the first and second planetary gear sets 20, 30. However, as an alternative, the clutch 52 could be positioned to the left of the planetary gear set 20.

Figure 4:
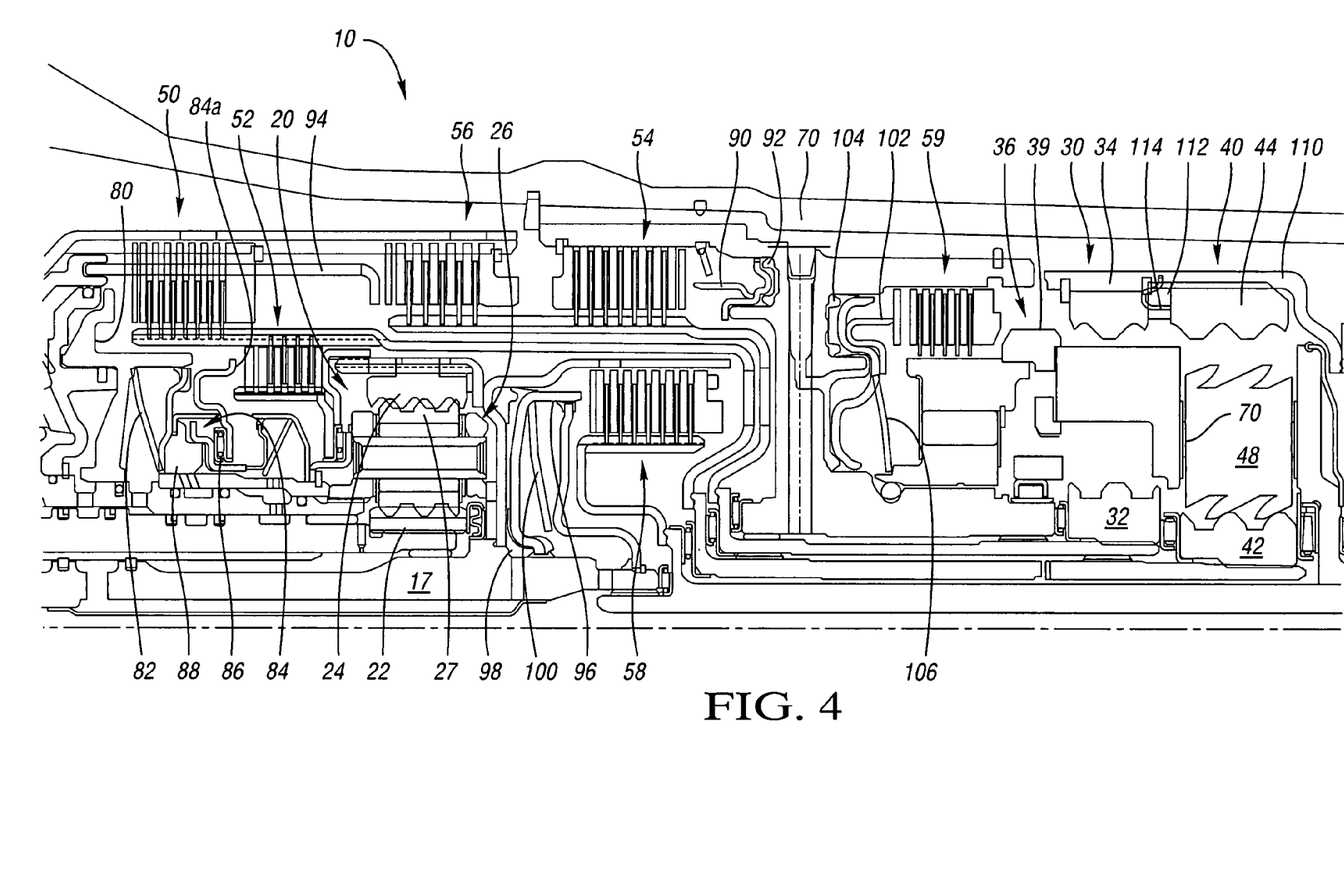
FIG. 4 shows a partial longitudinal cross-sectional view of a transmission in accordance with a first embodiment of the invention.

FIG. 4 shows a first embodiment of the invention wherein the clutch 52 is positioned to the left of the planetary gear set 20, contrary to the configuration shown in FIG. 2 wherein the clutch 52 is positioned to the right of the planetary gear set 20. Accordingly, in this configuration, the clutch 52 is at a location which is not between the first, second and third planetary gear sets.

Like reference numerals are used in FIG. 4 to refer to like components from FIGS. 1 and 2.

FIG. 4 shows the relationship between the planetary gear sets 20, 30, 40 and the torque-transmitting mechanisms 50, 52, 54, 56, 58, 59. As shown, the clutch 50 is applied by the piston 80 against the force of the return spring 82.

The clutch 52 is applied by the piston 84 via the roller bearing 86 and apply plate 84a when fluid is forced into the apply chamber 88. The piston 84 may rotate at a different speed than the apply plate 84a that rotates at the speed of the ring gear 24 as a result of relative movement allowed by the bearing 86.

The brake 54 is applied by the piston 90 when fluid is forced into the apply chamber 92.

The clutch 56 is applied by the castellated piston member 94.

The clutch 58 is applied by the piston 96 when fluid is forced into the apply chamber 98, and the piston 96 moves against the bias of the return spring 100.

The brake 59 is applied by the piston 102 when apply fluid is forced into the apply chamber 104, which causes the piston 102 to move against the bias of the return spring 106.

FIG. 4 also illustrates the integral connection of the ring gears 34, 44. The ring gears 34, 44 are splined to a sleeve 110, and separated by a spacer 112 and return spring 114.

Figure 5:
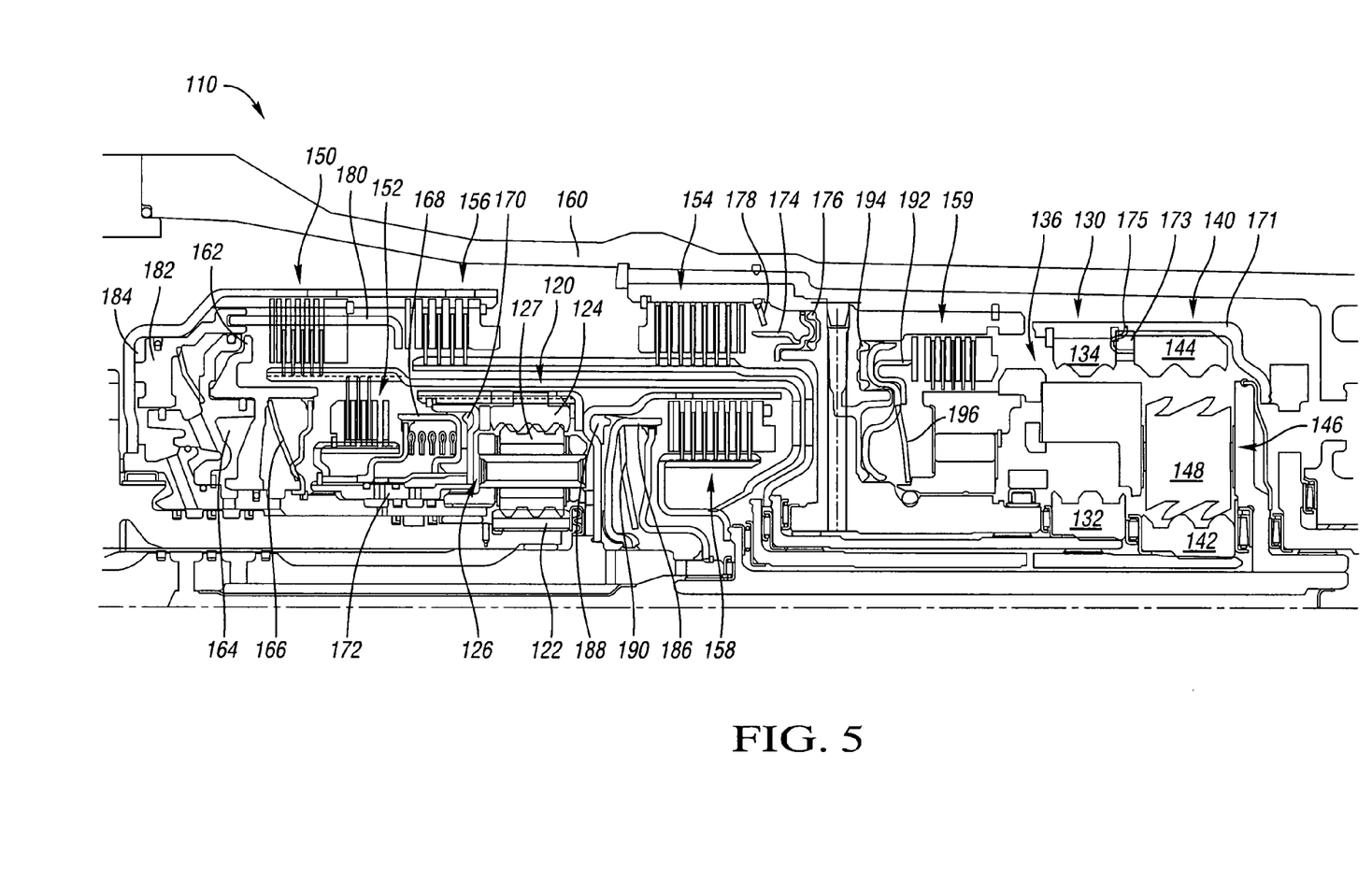
FIG. 5 shows a partial longitudinal cross-sectional view of a transmission in accordance with a second embodiment of the invention.

FIG. 5 shows a partial longitudinal cross-sectional view of a transmission 110 in accordance with a second embodiment of the invention. This configuration includes three planetary gear sets 120, 130, 140. The first planetary gear set 120 includes a sun gear 122, ring gear 124, and pinion 127. The pinion 127 is meshed with both the sun gear 122 and the ring gear 124, and is supported by the carrier 126.

The planetary gear set 130 includes a sun gear 132, a ring gear 134, and a pinion (not shown) which is supported by a carrier 136.

The planetary gear set 140 is a compound planetary gear set including the sun gear 142, ring gear 144, and pinions 148. The pinions 148 are supported on a carrier 146, which is integrally connected with the carrier 136 by an interconnecting member which is not shown (corresponding with interconnecting member 70 of FIG. 1).

The ring gears 134, 144 are integrally connected by being splined to a sleeve 171, and separated by a spacer 173 and spring member 175.

The various members of the planetary gear sets 120, 130, 140 are selectively connectable with each other and with the transmission housing 160 via the torque-transmitting mechanisms 150, 152, 154, 156, 158 and 159. The interconnections of FIG. 5 correspond with the lever diagram of FIG. 2. Specifically, in FIG. 5, the torque-transmitting mechanisms 150, 152, 154, 156, 158, 159 correspond functionally with the torque-transmitting mechanisms 50, 52, 54, 56, 58, 59, respectively, from FIGS. 1–3b.

The clutch 150 is applied by the piston 162 when fluid is forced into the apply chamber 164 to move the piston 162 against the force of the return spring 166.

The clutch 152 is applied by the piston 168 when fluid is forced into the apply chamber 170. The piston 168 is supported on a housing member 172, which is integrally connected with the ring gear 124.

The clutch 154 is applied by the piston 174 when fluid is forced into the apply chamber 176 to move the piston 174 against the force of the return spring 178.

The torque-transmitting mechanism 156 is applied by movement of the castellated piston member 180 when the piston 182 is actuated by the injection of fluid into the apply chamber 184.

The clutch 158 is applied by the piston 186 when fluid is forced into the apply chamber 188 to advance the piston 186 against the force of the return spring 190.

The clutch 159 is applied by the piston 192 when fluid is forced into the apply chamber 194 to move the piston 192 against the force of the return spring 196.

Figure 6:
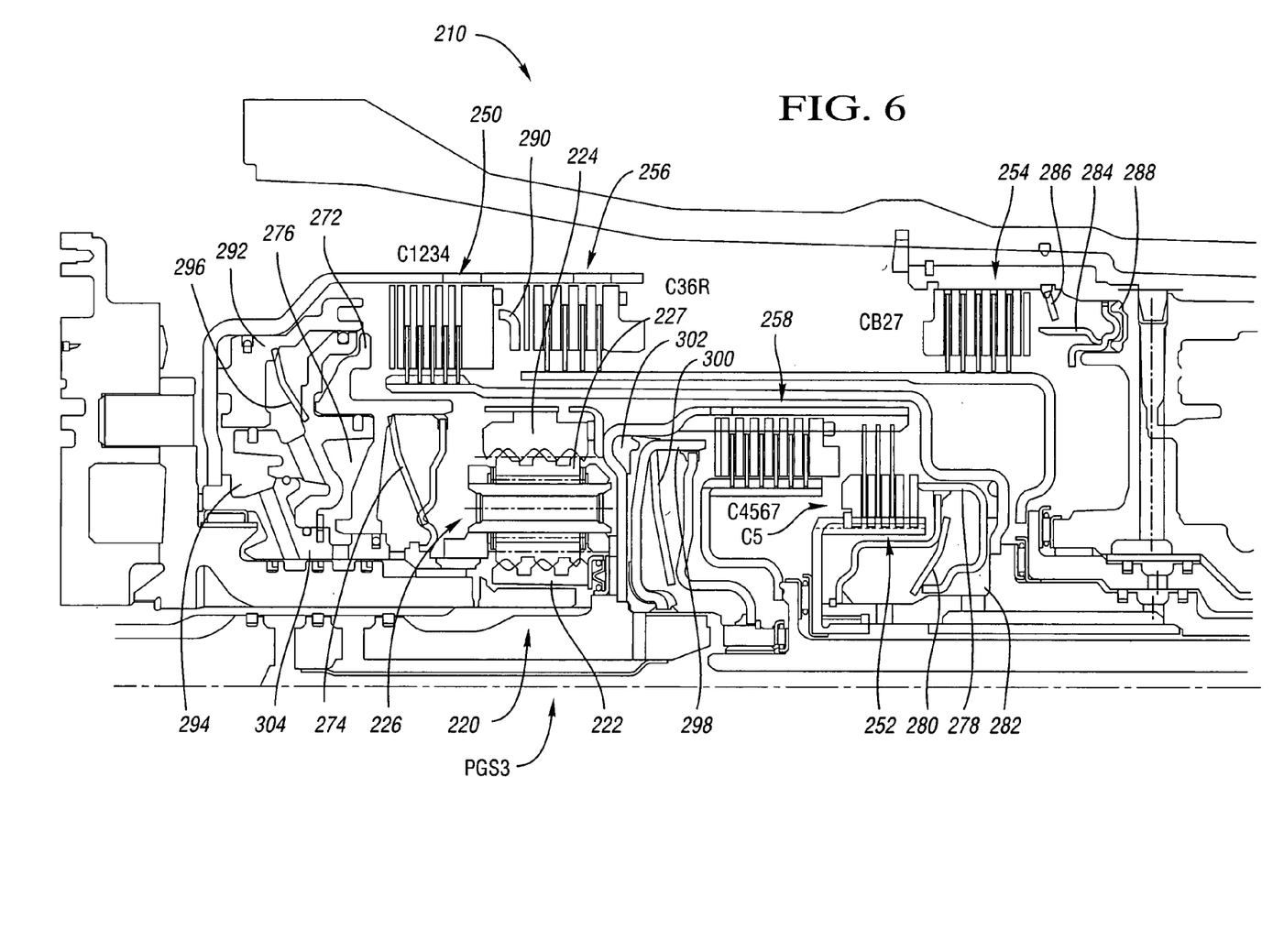
FIG. 6 shows a partial longitudinal cross-sectional view of a transmission in accordance with a third embodiment of the invention.

Turning to FIG. 6, a partial longitudinal cross-sectional view of a transmission 210 is shown in accordance with a third embodiment of the invention. This transmission 210 includes three planetary gear sets, although only the first planetary gear set 220 is shown. The planetary gear set 220 includes the sun gear 222, ring gear 224, and pinion 227 which is supported by the carrier 226. Five of the six torque-transmitting mechanisms corresponding with FIG. 2 are illustrated in FIG. 6. Clutch 250 corresponds with clutch 50 of FIG. 2; clutch 252 corresponds with clutch 52 of FIG. 2; clutch 254 corresponds with clutch 54 of FIG. 2; clutch 256 corresponds with clutch 56 of FIG. 2; and clutch 258 corresponds with clutch 58 of FIG. 2. A clutch corresponding with the clutch 59 of FIG. 2 is also included, but not shown. Its position and function would be similar to that of the clutch 159 shown in FIG. 5.

Returning to FIG. 6, the clutch 250 is applied by movement of the piston 272 against the force of the return spring 274 when fluid is forced into the apply chamber 276.

The clutch 252 is applied by the piston 278 against the force of the return spring 280 when fluid is forced into the apply chamber 282.

The clutch 254 is applied by movement of the piston 284 against the force of the return spring 286 when fluid is forced into the apply chamber 288.

The clutch 256 is applied by the piston members 290, 292 when fluid is forced into the apply chamber 294 to move the piston member 292 against the force of the return spring 296.

The clutch 258 is applied by movement of the piston 298 against the force of the return spring 300 when fluid is forced into the apply chamber 302.

The piston members 272 and 292 are supported on the rotating carrier member 304, which is connected with the carrier 226.

The transmissions shown in FIGS. 4–6 are operated in accordance with the truth table of FIG. 3a.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
an input shaft;
an output shaft;
a planetary gear arrangement having first, second and third planetary gear sets, each planetary gear set having first, second and third members;
said input shaft being continuously interconnected with said first member of said first planetary gear set, and said output shaft being continuously interconnected with said first member of said third planetary gear set;
said first member of said second planetary gear set being integrally connected with said first member of said third planetary gear set; and said third member of said first planetary gear set being continuously connected with a transmission housing;
an interconnecting member continuously interconnecting said second member of said second planetary gear set with said second member of said third planetary gear set;
a first torque-transmitting mechanism selectively interconnecting said second member of said first planetary gear set with said third member of said third planetary gear set;
a second torque-transmitting mechanism selectively interconnecting said first member of said first planetary gear set with said third member of said third planetary gear set;
a third torque-transmitting mechanism selectively interconnecting said third member of said second planetary gear set with said transmission housing;
a fourth torque-transmitting mechanism selectively interconnecting said second member of said first planetary gear set with said third member of said second planetary gear set;
a fifth torque-transmitting mechanism selectively interconnecting said first member of said first planetary gear set with said second member of said third planetary gear set;
a sixth torque-transmitting mechanism selectively interconnecting said second member of said second planetary gear set with said transmission housing; and
said first, second, third, fourth, fifth and sixth torque-transmitting mechanisms being engaged in combinations of two to establish seven forward speed ratios and a reverse speed ratio between said input shaft and said output shaft.

2. The transmission of claim 1, wherein said first member of said second planetary gear set and said first member of said third planetary gear set comprise a single elongated ring gear.

3. The transmission of claim 1, wherein said first and second planetary gear sets are simple planetary gear sets, and said third planetary gear set is a compound planetary gear set.

4. The transmission of claim 1, wherein each of said first members is a ring gear, each of said second members is a planet carrier assembly member, and each of said third members is a sun gear.

5. The transmission of claim 1, wherein said first, second, fourth and fifth torque-transmitting mechanisms comprise rotating clutches, and said third and sixth torque-transmitting mechanisms comprise brakes.

6. The transmission of claim 1, wherein said first member of said second planetary gear set and said first member of said third planetary gear set comprise ring gears which are integrally connected by a sleeve to which both ring gears are splined.

7. The transmission of claim 6, further comprising a spacer and spring member positioned between said first member of said second planetary gear set and said first member of said third planetary gear set.

8. The transmission of claim 1, wherein said second torque-transmitting mechanism is positioned between said first and second planetary gear sets.

9. The transmission of claim 1, wherein said second torque-transmitting mechanism is positioned at a location which is not between said first, second and third planetary gear sets.

10. The transmission of claim 4, wherein said second torque-transmitting mechanism is engaged by a piston which is supported on and rotating with a housing member which is integrally connected with the ring gear of said first planetary gear set.

11. The transmission of claim 4, wherein said second torque-transmitting mechanism is engaged by a piston which is supported on and rotating with a housing member which is integrally connected with the planet carrier assembly member of said first planetary gear set.

12. A multi-speed transmission comprising:
an input shaft;
an output shaft;
a planetary gear arrangement having first, second and third planetary gear sets, each planetary gear set having a ring gear, a planet carrier assembly member, and a sun gear;
said input shaft being continuously interconnected with said ring gear of said first planetary gear set, and said output shaft being continuously interconnected with said ring gear of said third planetary gear set;
said ring gear of said second planetary gear set being integrally connected with said ring gear of said third planetary gear set; and said sun gear of said first planetary gear set being continuously connected with a transmission housing;
an interconnecting member continuously interconnecting said planet carrier assembly member of said second planetary gear set with said planet carrier assembly member of said third planetary gear set;
a first torque-transmitting mechanism selectively interconnecting said planet carrier assembly member of said first planetary gear set with said sun gear of said third planetary gear set;
a second torque-transmitting mechanism selectively interconnecting said ring gear of said first planetary gear set with said sun gear of said third planetary gear set;
a third torque-transmitting mechanism selectively interconnecting said sun gear of said second planetary gear set with said transmission housing;
a fourth torque-transmitting mechanism selectively interconnecting said planet carrier assembly member of said first planetary gear set with said sun gear of said second planetary gear set;
a fifth torque-transmitting mechanism selectively interconnecting said ring gear of said first planetary gear set with said planet carrier assembly member of said third planetary gear set;
a sixth torque-transmitting mechanism selectively interconnecting said planet carrier assembly member of said second planetary gear set with said transmission housing; and
said first, second, third, fourth, fifth and sixth torque-transmitting mechanisms being engaged in combinations of two to establish seven forward speed ratios and a reverse speed ratio between said input shaft and said output shaft.

13. The transmission of claim 12, wherein said ring gear of said second planetary gear set and said ring gear of said third planetary gear set comprise a single elongated ring gear.

14. The transmission of claim 12, wherein said first and second planetary gear sets are simple planetary gear sets, and said third planetary gear set is a compound planetary gear set.

15. The transmission of claim 12, wherein said first, second, fourth and fifth torque-transmitting mechanisms comprise rotating clutches, and said third and sixth torque-transmitting mechanisms comprise brakes.

16. The transmission of claim 12, wherein said ring gear of said second planetary gear set and said ring gear of said third planetary gear set are integrally connected by a sleeve to which both ring gears are splined.

17. The transmission of claim 16, further comprising a spacer and spring member positioned between said ring gear of said second planetary gear set and said ring gear of said third planetary gear set.

18. The transmission of claim 12, wherein said second torque-transmitting mechanism is positioned between said first and second planetary gear sets.

19. The transmission of claim 12, wherein said planet carrier assembly member of said second planetary gear set is continuously connected with said planet carrier assembly member of said third planetary gear set, and said second torque-transmitting mechanism is positioned at a location which is not between said first, second and third planetary gear sets.

20. A multi-speed transmission comprising:
an input shaft;
an output shaft;
a planetary gear arrangement having first, second and third planetary gear sets, each planetary gear set having a ring gear, a planet carrier assembly member, and a sun gear;
wherein said second planetary gear set is a simple planetary gear set, and said third planetary gear set is a compound planetary gear set;
said input shaft being continuously interconnected with said ring gear of said first planetary gear set, and said output shaft being continuously interconnected with said ring gear of said third planetary gear set;
said ring gear of said second planetary gear set being integrally connected with said ring gear of said third planetary gear set; and said sun gear of said first planetary gear set being continuously connected with a transmission housing;
wherein said ring gear of said second planetary gear set and said ring gear of said third planetary gear set are integrally connected by a sleeve to which both ring gears are splined, and a spacer and spring member are positioned between said ring gear of said second planetary gear set and said ring gear of said third planetary gear set;
an interconnecting member continuously interconnecting said planet carrier assembly member of said second planetary gear set with said planet carrier assembly member of said third planetary gear set;
a first torque-transmitting mechanism selectively interconnecting said planet carrier assembly member of said first planetary gear set with said sun gear of said third planetary gear set;
a second torque-transmitting mechanism selectively interconnecting said ring gear of said first planetary gear set with said sun gear of said third planetary gear set, wherein said second torque-transmitting mechanism is not positioned between said first and second planetary gear sets;
a third torque-transmitting mechanism selectively interconnecting said sun gear of said second planetary gear set with said transmission housing;
a fourth torque-transmitting mechanism selectively interconnecting said planet carrier assembly member of said first planetary gear set with said sun gear of said second planetary gear set;
a fifth torque-transmitting mechanism selectively interconnecting said ring gear of said first planetary gear set with said planet carrier assembly member of said third planetary gear set;

a sixth torque-transmitting mechanism selectively interconnecting said planet carrier assembly member of said second planetary gear set with said transmission housing; and said first, second, third, fourth, fifth and sixth torque-transmitting mechanisms being engaged in combinations of two to establish seven forward speed ratios and a reverse speed ratio between said input shaft and said output shaft.

21. The transmission housing of claim 20, wherein said first, second, fourth and fifth torque-transmitting mechanisms comprise rotating clutches, and said third and sixth torque-transmitting mechanisms comprise brakes.

22. The transmission of claim 20, wherein said planet carrier assembly member of said second planetary gear set is continuously connected with said planet carrier assembly member of said third planetary gear set.

* * * * *